(12) United States Patent
Goto et al.

(10) Patent No.: US 6,717,729 B2
(45) Date of Patent: Apr. 6, 2004

(54) POLARIZED LIGHT IRRADIATION APPARATUS

(75) Inventors: Manabu Goto, Yokohama (JP); Masashi Shinbori, Oyama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/874,322

(22) Filed: Jun. 6, 2001

(65) Prior Publication Data
US 2001/0050740 A1 Dec. 13, 2001

(30) Foreign Application Priority Data
Jun. 6, 2000 (JP) .......................... 2000-169631

(51) Int. Cl.[7] .......................... G02B 5/30; G02B 27/28; F21V 9/14; G03B 27/54; G03B 27/72
(52) U.S. Cl. .................. 359/485; 359/487; 359/584; 359/884; 362/19; 355/67; 355/71
(58) Field of Search .................. 359/485, 487, 359/584, 857, 884, 883, 350, 352, 589; 355/67, 71; 362/19

(56) References Cited

U.S. PATENT DOCUMENTS

| | | | | |
|---|---|---|---|---|
| 4,312,570 A | * | 1/1982 | Southwell | |
| 4,320,936 A | * | 3/1982 | Sawamura | |
| 4,322,130 A | * | 3/1982 | Ito et al. | |
| 4,443,873 A | * | 4/1984 | Anthon | |
| 4,662,722 A | * | 5/1987 | Buczek et al. | 359/488 |
| 4,993,824 A | * | 2/1991 | Bluege | |
| 5,151,890 A | * | 9/1992 | Yonekubo | |
| 5,323,009 A | * | 6/1994 | Harris | |
| 5,378,509 A | * | 1/1995 | Achreiner | |
| 5,438,446 A | * | 8/1995 | Brandt | 359/196 |
| 5,756,961 A | * | 5/1998 | Sato et al. | |
| 5,934,780 A | * | 8/1999 | Tanaka | |
| 5,999,245 A | * | 12/1999 | Suzuki | |
| 6,190,016 B1 | * | 2/2001 | Suzuki et al. | |
| 6,413,268 B1 | * | 7/2002 | Hartman | |

FOREIGN PATENT DOCUMENTS

EP  1 020 739 A2  7/2000

OTHER PUBLICATIONS

The Applied Physics Handbook, Ed. Applied Physics Society, Maruzen Co., pp. 20–22.
Handbook of Optical Engineering, Asakura Shoten, Jul. 25, 1981, pp. 256–259, 412.
Handbook of Optical Engineering, Asakura Shoten, Jul. 25, 1981, p. 412.

* cited by examiner

Primary Examiner—Ricky D. Shafer
(74) Attorney, Agent, or Firm—Nixon Peabody LLP; David S. Safran (57) ABSTRACT

A polarized light irradiation apparatus, having at least two plane mirrors, is constructed to prevent reduction of the extinction ratio of the polarized light that irradiates a substrate when there is a change of the direction of polarization of the polarized light that is incident on a reflecting mirror. This is accomplished by forming a protection layer on the surface of the second plane mirror, and selecting the material and optical thickness of the layer in accordance with the angle of incidence and wavelength of the polarized light so that the difference Δ of the phase shifts of the polarization P component and the polarization S component emerging from the second plane mirror satisfies the condition that $\Delta \leq \pm 20°$. By doing this, there will be no reduction of the extinction ratio of the polarized light that irradiates the substrate W if there is a change in the polarization direction of the polarized light that is incident on the second plane mirror.

1 Claim, 13 Drawing Sheets

Drawing showing constitution of beam illumination equipment of first implementation of this invention

FIG. 1

Drawing showing constitution of beam illumination equipment of first implementation of this invention

FIG. 2

Graph showing difference of Polarization P component and Polarization S component phase shifts of reflected beam when a linear polarized beam is reflected by a pure aluminum mirror.

FIG. 3

Graph showing the difference in phase shifts when a film of magnesium fluoride (MgF$_2$) has been formed on the surface of the aluminum mirror (30° angle of incidence).

FIG. 4

Graph showing the difference in phase shifts when a film of magnesium fluoride (MgF$_2$) has been formed on the surface of the aluminum mirror (45° angle of incidence).

FIG. 5 Graph showing the difference, in phase shifts when a film of magnesium fluoride (MgF$_2$) has been formed on the surface of the aluminum mirror (50° angle of incidence).

FIG. 6

Graph showing the difference in phase shifts when a film of silicon dioxide (SiO₂) has been formed on the surface of the aluminum mirror (45° angle of incidence).

FIG. 7

Drawing showing constitution of beam illumination equipment of second implementation of this invention

FIG. 8

Graph showing the difference. between phase shifts of the Polarization P component and the Polarization S component of the reflected beam when the angle of incidence to the reflecting mirror (without a protective film) is varied

FIG. 9

Drawing to explain the angle of incidence to the reflecting mirror when using two reflecting mirrors and when using one reflecting mirror

FIG. 10

Drawing of third implementation of this invention

(a) Oblique view (b) View from direction A (c) View from direction B

FIG. 11

Drawing showing example of structure of beam illumination equipment capable of changing direction of polarization beam (Prior Art)

FIG. 12

Drawing showing linear polarized beam leaving polarization element, then entering and being reflected from mirror with an angle of incidence of 45°

FIG. 13

Drawing showing polarization P component and polarization S component when planes A and B of figure 12 are neither parallel nor perpendicular

FIG. 14

Drawing to explain elliptical polarized beam

POLARIZED LIGHT IRRADIATION APPARATUS

BACKGROUND OF THE INVENTION

1. Field of the Invention

This invention relates to polarized light irradiation apparatus for optical alignment of liquid crystals in which an alignment layer of a liquid crystal display element is irradiated with polarized light.

2. Description of Related Art

Liquid crystal display elements are produced by carrying out an alignment process to align the liquid crystals in the desired direction on an alignment layer formed on the surface of a transparent substrate; two of these transparent substrates are put together with the alignment layers facing inwardly, such that alignment layers are separated by a gap of a desired size, and thereafter, liquid crystal is injected into the gap.

The alignment process for the alignment layer is a technology called optical alignment, in which the alignment layer is exposed by irradiation with polarized light of a particular wavelength.

The most widely used liquid crystal display elements, called TN liquid crystal, are constructed such that the direction of alignment of the liquid crystal is rotated 90° between the two transparent substrates. Accordingly, it is necessary to have two transparent substrates with their alignment layers in different directions.

Moreover, the angle of view of the liquid crystal can be improved by dividing one pixel of the liquid crystal display element into two or more parts and changing the alignment direction of the liquid crystal in each of the divided pixels. This method is called the pixel division method or the multi-domain method.

When optical alignment is applied to this pixel division method, a mask is used and one portion of the divided pixel formed on the substrate is irradiated with polarized light, after which the mask is replaced and the other divided portion is irradiated with light with a different polarization direction.

It is desirable that the polarized light irradiation apparatus, used to irradiate the alignment layer with polarized light, be provided with the ability to change the desired direction of polarization of the polarized light to any desired direction for irradiation. The present applicant has proposed, in EP 1020739 A2, a light irradiation apparatus in which the direction of the polarized light used to irradiate the substrate can be changed without rotating the substrate by means of a rotating the polarization element within the light irradiation apparatus. An example of the structure of the light irradiation apparatus capable of changing the direction of the polarized light is illustrated in FIG. 11.

Figure 11:
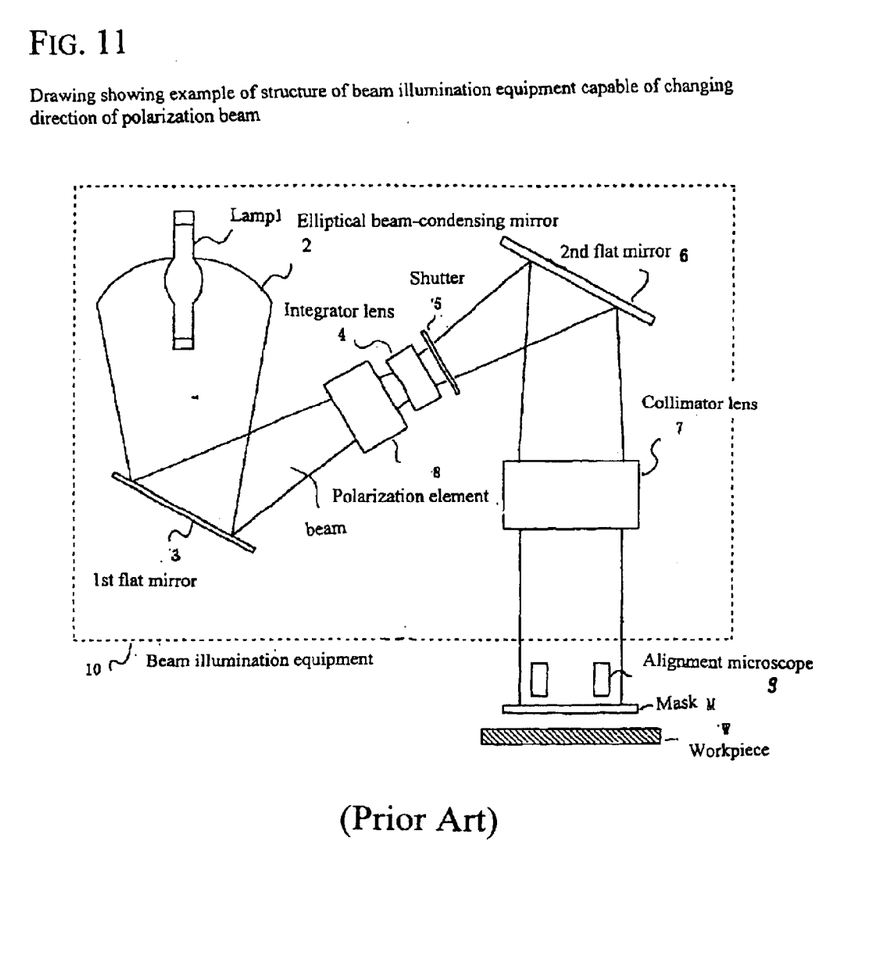
FIG. 11 illustrates the structure of light irradiation apparatus capable of changing the direction of the polarization light.

In FIG. 11, the light from the lamp 1 is condensed by an ellipsoidal condenser mirror 2, reflected by the first plane mirror 3 and is incident on the polarization element 8. The polarization element 8 is, for example, a device with multiple glass plates inclined at Brewster's angle with respect to the optical axis; light of polarization P passes through but most light of polarization S is reflected. By this method, it is possible to obtain polarized light with the desired extinction ratio. The polarized light P that emerges from the polarization element 8 is incident on the integrator lens 4, then passes through the shutter 5 and is reflected by the second plane mirror 6 into the collimator lens 7. The resulting parallel light rays pass through the mask M and irradiate the alignment layer of the workpiece (substrate) W. In this apparatus, the polarization element 8 is free to rotate around the optical axis of the center of the light flux that is incident on the polarization element 8, and by rotating the polarization element 8, it is possible to change and set, as desired, the direction of the polarized light that irradiates the alignment layer.

In addition, there are apparatus that, instead of rotating the polarization element 8, rotates the substrate stage (not illustrated) on which is mounted the workpiece W substrate on which the alignment layer is formed.

In the light irradiation apparatus, the required length of the optical path is determined from opti-metric issues including the area irradiated, the distribution of intensity, and the degree to which the rays irradiating the substrate are parallel. In order to make the light irradiation apparatus smaller while still maintaining the same length of optical path, the optical path is folded using the first plane mirror 3 and the second plane mirror 6.

These plane mirrors are fabricated by the vapor deposition of aluminum or some other metal on a quartz plate. To prevent damage to the mirror, the surface of the mirror is often covered with a protection layer, normally from 10 nm to more than 100 nm in thickness. Examples of such protection layers are magnesium fluoride ($MgF_2$), silicon dioxide ($SiO_2$), or aluminum oxide ($Al_2O_3$).

In order to optically align the alignment layer, the polarized light must be at a certain wavelength and must have an extinction ratio at or above a certain level. These values are determined by the properties of the alignment layer. The extinction ratio is the ratio between polarization P component of the light and the polarization S component. An extinction ratio of 10:1 or better is desirable for aligning the alignment layer. And it is common to use ultraviolet light with a wavelength in the range of 250 nm to 350 nm. However, in the apparatus in FIG. 11, even if a nearly linearly polarized light (with a good extinction ratio, between 20:1 and 15:1, for example) is emitted from the polarization element, it sometimes happens that when the polarization element is rotated to change the direction of polarization of the polarized light irradiating the substrate, the extinction ratio drops (to 6:1, for example) and the desired extinction ratio cannot be obtained.

As an example, if the polarization element is glass set at Brewster's angle, the polarized light P is a linearly polarized light. Further, it is known that generally, when linearly polarized light is reflected by a mirror, the phase shift of the reflected light can cause elliptical polarization. It is this elliptical polarization that is the cause of the extinction ratio reduction.

Figure 12:
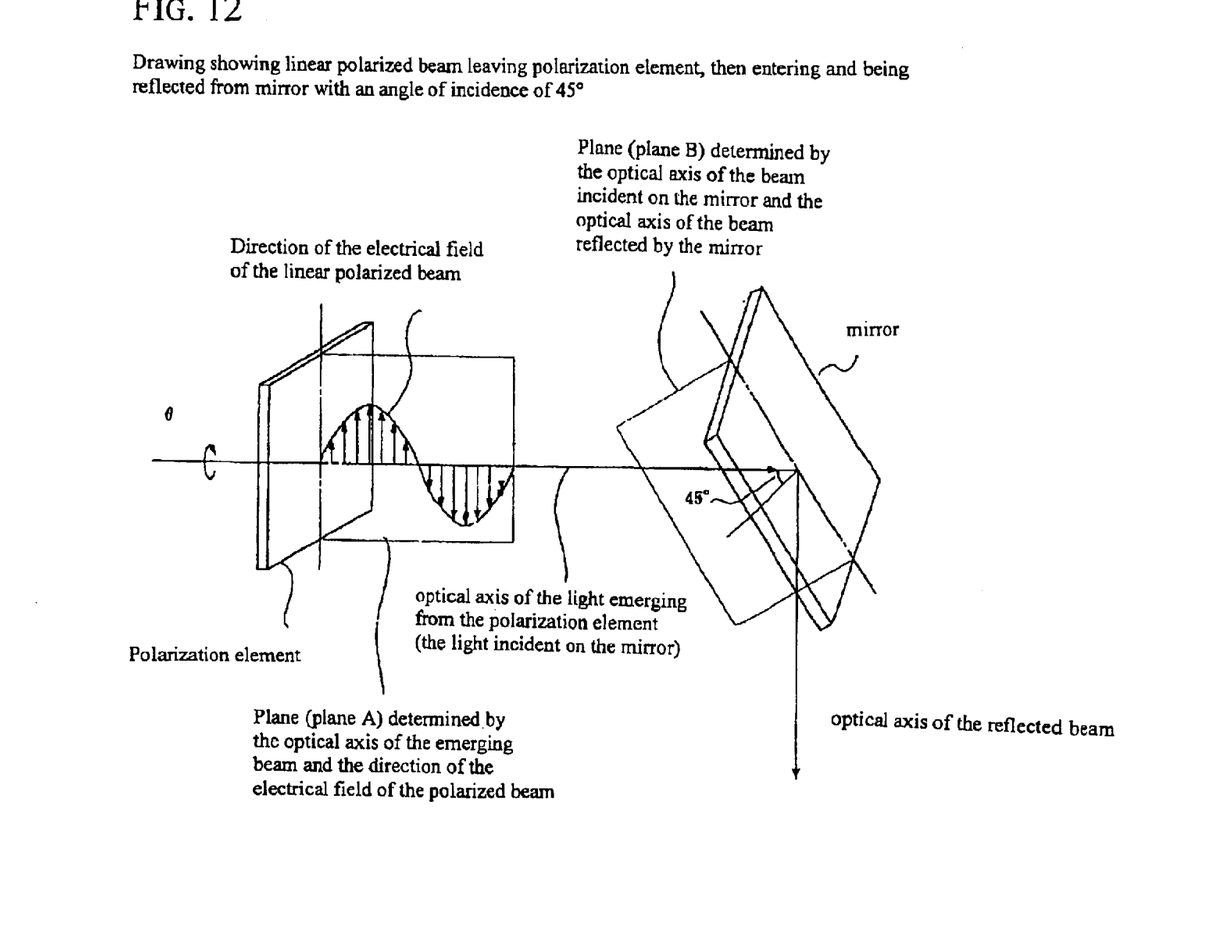
FIG. 12 illustrates the effect of a linearly polarized light leaving polarization element, then incident on and being reflected from mirror with an angle of incidence of 45°.

A simple explanation of the reason for elliptical polarization is shown in FIG. 12, which is an illustration showing the reflected state when a linearly polarized light emerges from the polarization element and is incident on the mirror with an angle of incidence of 45°. The polarized light that emerges from the polarization element has an electrical field that is aligned up and down with respect to the plane of the paper (the direction of polarization is up and down in the plane of the paper).

In FIG. 12, the optical axis of the polarized light that emerges from the polarization element is in the plane A determined by the direction of the electrical field of the polarized light. On the other hand, the optical axis of the light that is incident on the mirror (which is the light that emerges from the polarization element) is in plane B determined by the optical axis of the light reflected from the mirror. FIG. 12 illustrates the situation where plane A and plane B are parallel to each other. However, if the polarization element is rotated around the optical axis, plane A and plane B are no longer parallel, and the polarization element is inclined 90° from its state in FIG. 12; plane A and plane B would then be perpendicular to each other.

At the plane of reflection of the mirror, the component of the light that is incident on the mirror that is parallel to plane B is the polarization component P, and the component that is perpendicular to plane B is the polarization component S.

When plane A and plane B are in a parallel or perpendicular relationship, the direction of the electric field of the polarized light incident on the mirror (the direction of polarization) can have only a polarization P component or a polarization S component. For example, if the direction of the electric field of the polarized light incident on the mirror (the direction of polarization) is as shown in FIG. 13, the light that is incident on the mirror will have both a polarization P component and a polarization S component.

There is generally a phase shift when light is reflected by a mirror, and that phase discrepancy is known to be different for the polarization P component and the polarization S component. When the polarized light incident on the mirror has only a polarization P component or a polarization S component (when plane A and plane B are in a parallel or perpendicular relationship), the phase shift still occurs, but the reflected light is a linearly polarized light with the same extinction ratio as the incident light, since there is only a polarization P component or a polarization S component.

Figure 13:
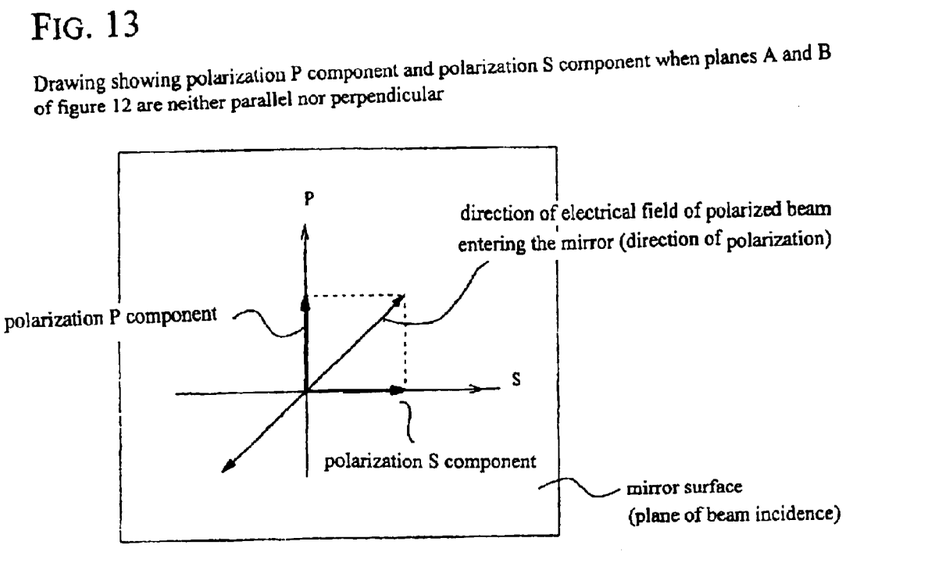
FIG. 13 illustrates the polarization P component and polarization S component when planes A and B of FIG. 12 are neither parallel nor perpendicular.
Figure 14:
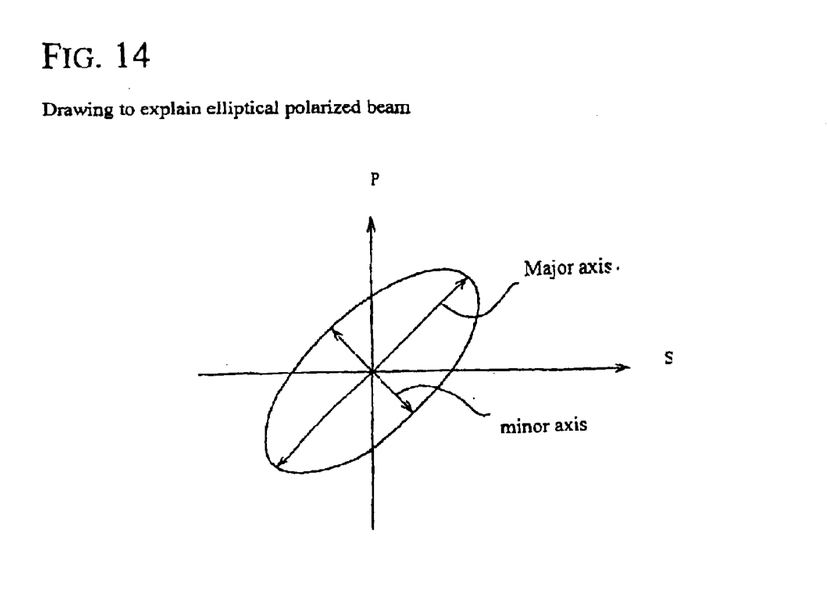
FIG. 14 illustrates an elliptical polarized light.

However, if the polarized light is incident on the mirror having both a polarization P component and a polarization S component as in FIG. 13, then as described above, the phase shift of the polarization P component and the phase shift of the polarization S component will be different, causing a phase difference between the polarization P component and the polarization S component, resulting in an elliptically polarized light as shown in FIG. 14 (for greater detail please see, for example, *The Applied Physics Handbook*, ed. Applied Physics Society, Maruzen Co., pp. 20–22). That is, even with an ideal linearly polarized light (infinitely large extinction ratio), if plane A and plane B are not in a parallel or perpendicular relationship, the light emerging from the mirror will be an elliptically polarized light. The extinction ratio of the elliptically polarized light will be lowered, since it is expressed as the ratio of the minor axis of the ellipse to the major axis shown in FIG. 14.

In the apparatus shown in FIG. 11, therefore, when the polarization element 8 is rotated to change the direction of polarization of the polarized light that irradiates the workpiece W, the relationship between plane A and plane B will no longer be parallel or perpendicular; the polarized light becomes elliptical when reflected by the second plane mirror, and the extinction ratio of the polarized light that irradiates the workpiece W is thereby reduced.

SUMMARY OF THE INVENTION

The object of the instant invention is to solve the problem of the conventional irradiation technology described above. The invention described herein provides a polarized light irradiation apparatus that uses optical alignment to irradiate an alignment layer formed on a substrate with polarized light that is incident on a reflecting mirror and is reflected by that reflecting mirror such that changing the direction of polarization of the polarized light incident on the reflecting mirror does not reduce the extinction ratio of the polarized light irradiating the substrate, relative to the extinction ratio of the polarized light emerging from the polarization element.

Taking the bearing of the linearly polarized light incident on the mirror as $\alpha$ and the difference in phase shift between the Polarization P component and the Polarization S component due to reflection by the mirror as $\Delta$, then the angle of ellipticity $\epsilon$ determined by the ratio of the major axis and the minor axis of the elliptically polarized light of reflected light has the relationship $\sin 2\epsilon = \sin 2\alpha \times \sin \Delta$ (see, for example the "Handbook of Optical Engineering", Asakura Shoten, Jul. 25, 1981, page 412).

Moreover, the extinction ratio can be expressed as $(1/\tan \epsilon)^2 : 1$. From this it can be seen that the smaller the angle of ellipticity, a higher extinction rate can be obtained. When a linearly polarized light with an extinction rate of infinity:1 is incident on the mirror, if $\epsilon = 0$, then the extinction rate of the reflected light will be infinity:1.

On the other hand, $\sin 2\epsilon = \sin 2\alpha \times \sin \Delta$, and so if $\Delta = 0$, then $\epsilon = 0$ as well, in which case the extinction ratio does not depend on the direction of polarization of the polarized light, and becomes infinity:1. As $\Delta$ becomes larger, $\epsilon$ can increase as well. In that event, when the polarized light is incident on the mirror with the direction of polarization inclined at 45°, the extinction ratio of the reflected light will be 1:1.

Accordingly, in order not to reduce the extinction rate of the reflected light, the reflecting mirror should be constituted so that ideally $\Delta = 0$, or $\Delta$ 0.

Calculating from the equation above, when the polarized light is incident on the mirror with an extinction ratio of 15:1, obtaining a reflected light with an extinction ratio of 10:1 requires that $\Delta \leq \pm 20°$, a reflected light with an extinction ratio of 12:1 requires that $\Delta \leq \pm 15°$, and a reflected light with an extinction ratio of 13.5:1 requires that $\Delta \pm \cong 10°$.

As stated above, to align an alignment layer on a substrate it is desirable that the extinction ratio be at least 10:1. That requires that $\Delta \leq \pm 20°$, and the means described below enables $\Delta \leq \pm 20°$ to be achieved.

The difference $\Delta$ between phase shifts of the polarization P component and the polarization S component depends on the wavelength and angle of incidence of the light as it is incident on the mirror. In the event that a protection layer has been formed on the surface of the mirror, the type of layer and its thickness are factors as well. Therefore, as explained below, it is possible to set the angle of incidence of the polarized light arriving at the mirror and the thickness of the protection layer at appropriate values, and then position the mirror so as to hold down the difference $\Delta$ in the phase shifts of the polarization P component and the polarization S component.

(1) When a layer is formed on the surface of the mirror, and when light is incident on the mirror, the phase of the light that passes through the layer and is reflected from the mirror is delayed, in accordance with the optical thickness of the layer, relative to the phase of the light that is reflected from the surface of the layer.

By taking advantage of this phase shift due to formation of a layer, it is possible to reduce the difference $\Delta$ in the phase shifts of the polarization P component and the polarization S component.

This difference $\Delta$ in the phase shifts depends on the angle of incidence of the polarized light on the mirror. Further, the wavelength used for optical alignment is decided by the type of optical alignment layer. Accordingly, if the type of protection layer formed on the surface of the mirror and the optical thickness of that layer are selected in accordance with the wavelength needed to align the optical alignment layer and the angle of incidence of the polarized light on the mirror as decided by the optical design, it will be possible to make $\Delta \leq \pm 20°$ and to make the extinction rate at least 10:1.

(2) If the angle of incidence of the polarized light on the reflecting mirror is small, it is possible to reduce the difference $\Delta$ in the phase shifts of the polarization P component and the polarization S component of the reflected light.

Consequently, if multiple reflecting mirrors are combined and the angle of incidence of the polarized light on each reflecting mirror is kept small, it is possible to make $\Delta \leq \pm 20°$ and to make the extinction rate at least 10:1.

(3) Using first and second reflecting mirrors of the same material, by positioning them so that the plane determined by the optical axis of the light incident on the second reflecting mirror and the optical axis of the reflected light is perpendicular to the optical axis of the light incident on the first reflecting mirror and the optical axis of the reflected light, so that the angle of incidence of the first reflecting mirror is the same as the angle of incidence of the second reflecting mirror, then it is possible to have the phase shift caused by reflection in the first mirror negated by the reflection in the first mirror.

Consequently, by using at least two reflecting mirrors, the first and the second, and by positioning the reflecting mirrors as described above, the phase shift of the polarization P component and the polarization S component can be eliminated, and the polarized light reflected from the second reflecting mirror can be a linearly polarized light.

DETAIL DESCRIPTION OF THE INVENTION

Figure 1:
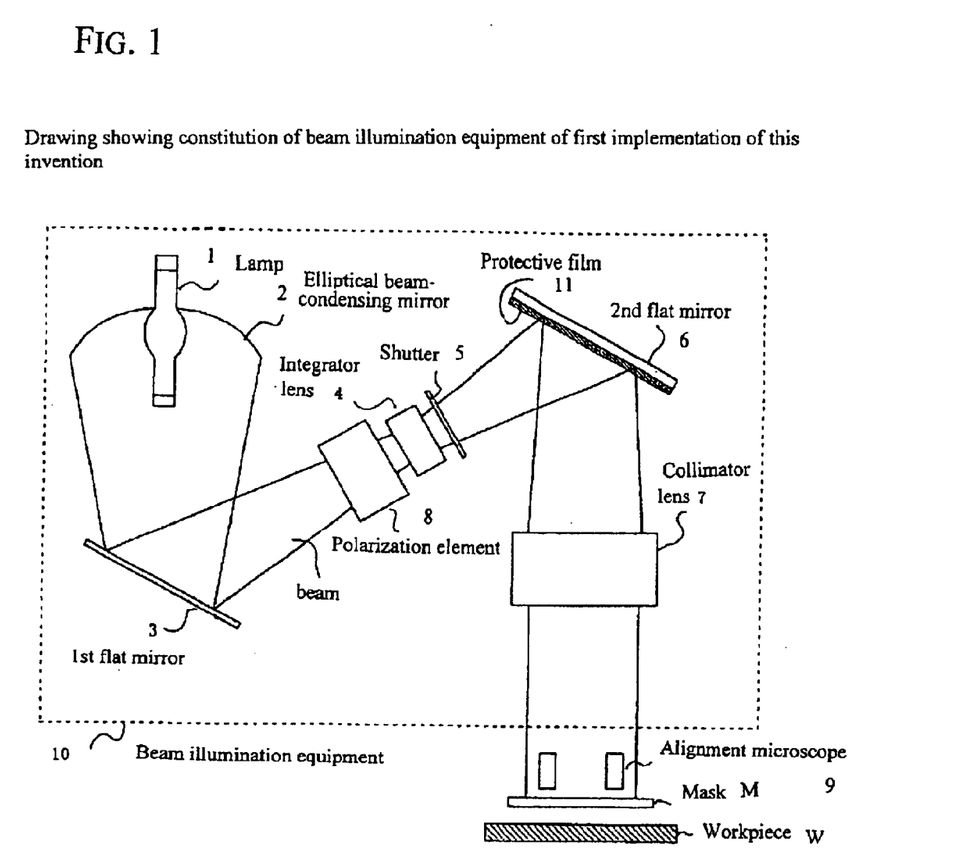
FIG. 1 is a polarized light irradiation apparatus of the first embodiment of the invention.

The first embodiment of the polarized light irradiation apparatus of the invention is shown in FIG. 1. In FIG. 1, the element identified are the same as those in FIG. 11, but in this embodiment, the surface of the second plane mirror 6 has been treated with a dielectric layer (protection layer) 11. The material of the dielectric layer and its thickness are selected, in connection with the angle of incidence of the polarized light on the second plane mirror 6 and the wavelength needed to align the optical alignment layer formed on the workpiece W, so that the difference in phase shifts $\Delta$ of the polarization P component and polarization S component of the polarized light that reflects is no greater than 20°. The second plane mirror 6 is, for example, an aluminum mirror, and the dielectric layer 11 formed on its surface (hereafter protection layer 11) can be, for example, a magnesium fluoride ($MgF_2$) layer or a silicon dioxide ($SiO_2$) layer.

In FIG. 1, the light from the lamp 1 is condensed by an ellipsoidal condenser mirror 2, then the optical path is folded by the first plane mirror 3 and is incident on the polarization element 8. The polarization element 8 is a device with multiple glass plates inclined at Brewster's angle with respect to the optical axis where the light of polarization P passes through but most light of polarization S is reflected. This yields polarized light of light with the desired extinction ratio.

The polarized light P that emerges from the polarization element 8 is incident on the integrator lens 4, then passes through the shutter 5 and is reflected by the second plane mirror 6, the surface of which is coated with a protection layer 11 into the collimator lens 7. The resulting parallel rays pass through the mask M and irradiate the alignment layer of the workpiece W.

Within the irradiation apparatus 10, the polarization element 8 can rotate around the optical axis of the light flux that is incident on the polarization element 8, and by rotating the polarization element 8, it is possible to change and set, as desired, the direction of the polarized light that irradiates the alignment layer.

An explanation regarding selection of the type and thickness of the protection layer 11 that is formed on the second plane mirror 6 will now be provided.

Figure 2:
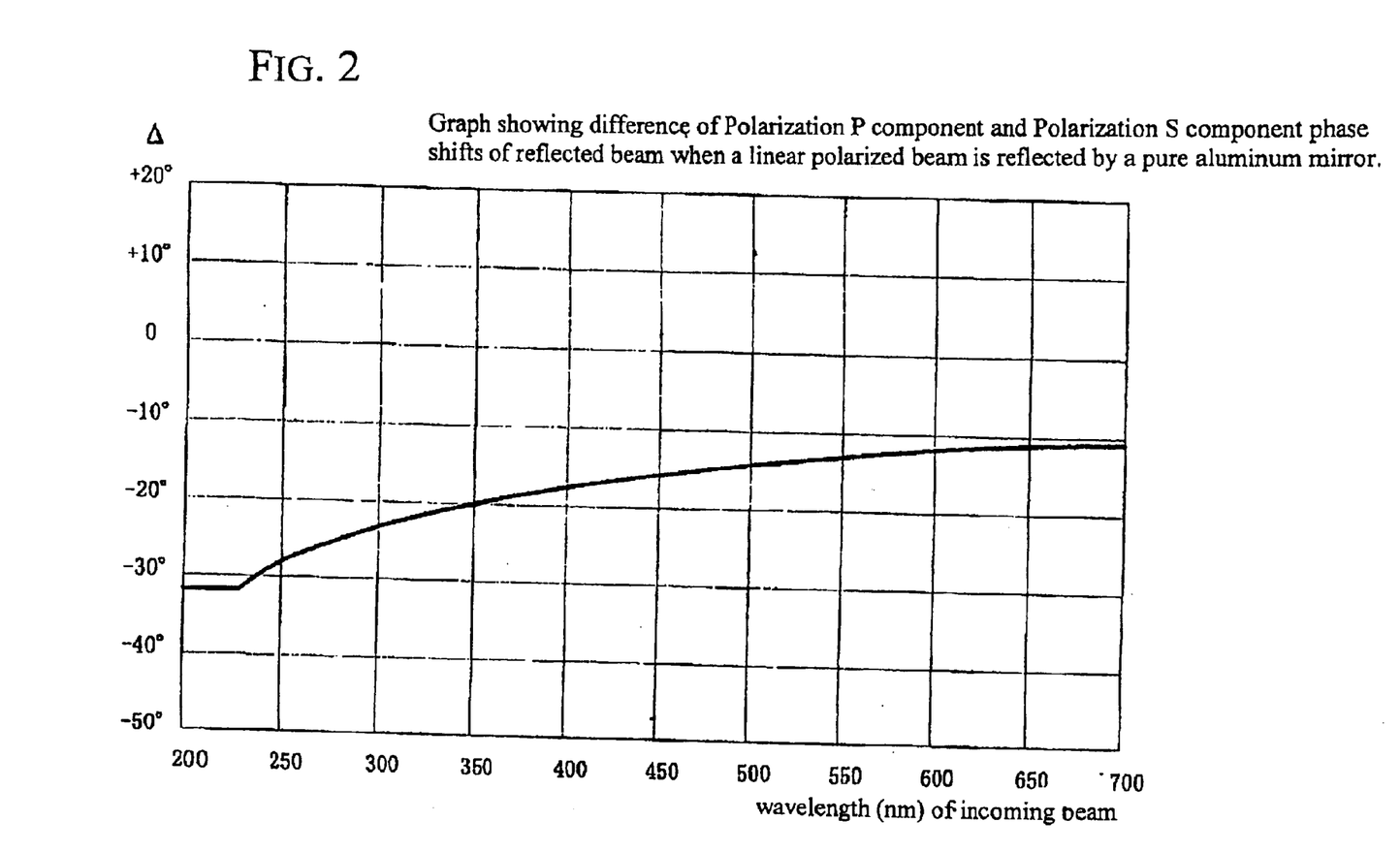
FIG. 2 is a graph illustrating difference $\Delta$ of polarization P component and polarization S component phase shifts of reflected light when a linearly polarized light is reflected by a pure aluminum mirror.

FIG. 2 is a graph showing difference $\Delta$ (calculated) of polarization P component and polarization S component phase shifts of the reflected light when a linearly polarized light is reflected by a pure aluminum mirror (with no protection layer). The graph shows a case where the polarized light's angle of incidence to the mirror is 45° (that is, the optical path is folded 90° by the reflecting mirror, as in FIG. 12 where plane A and plane B intersected at 45° (this is the case in which the extinction ratio of the reflected light drops the greatest).

In the FIG. 2 graph, the horizontal axis is the wavelength (nm) of the incident polarized light, and the vertical axis is the difference Δ in degrees of the phase shifts of the polarization P component and the polarization S component.

Now, in the present embodiment light with a wavelength in the area of 250 nm to 350 nm is used for optical alignment, and so the following explanation will deal primarily with polarized light in that wavelength range.

In this range of wavelengths, even though the relationship between plane A and plane B in FIG. 12 is not perpendicular or parallel, as long as Δ=0 there is no drop in the extinction ratio.

However, it is clear from FIG. 2 that in that range of wavelengths, Δ is between −30° and −20°, and so reflection causes a drop in the extinction ratio.

Figure 3:
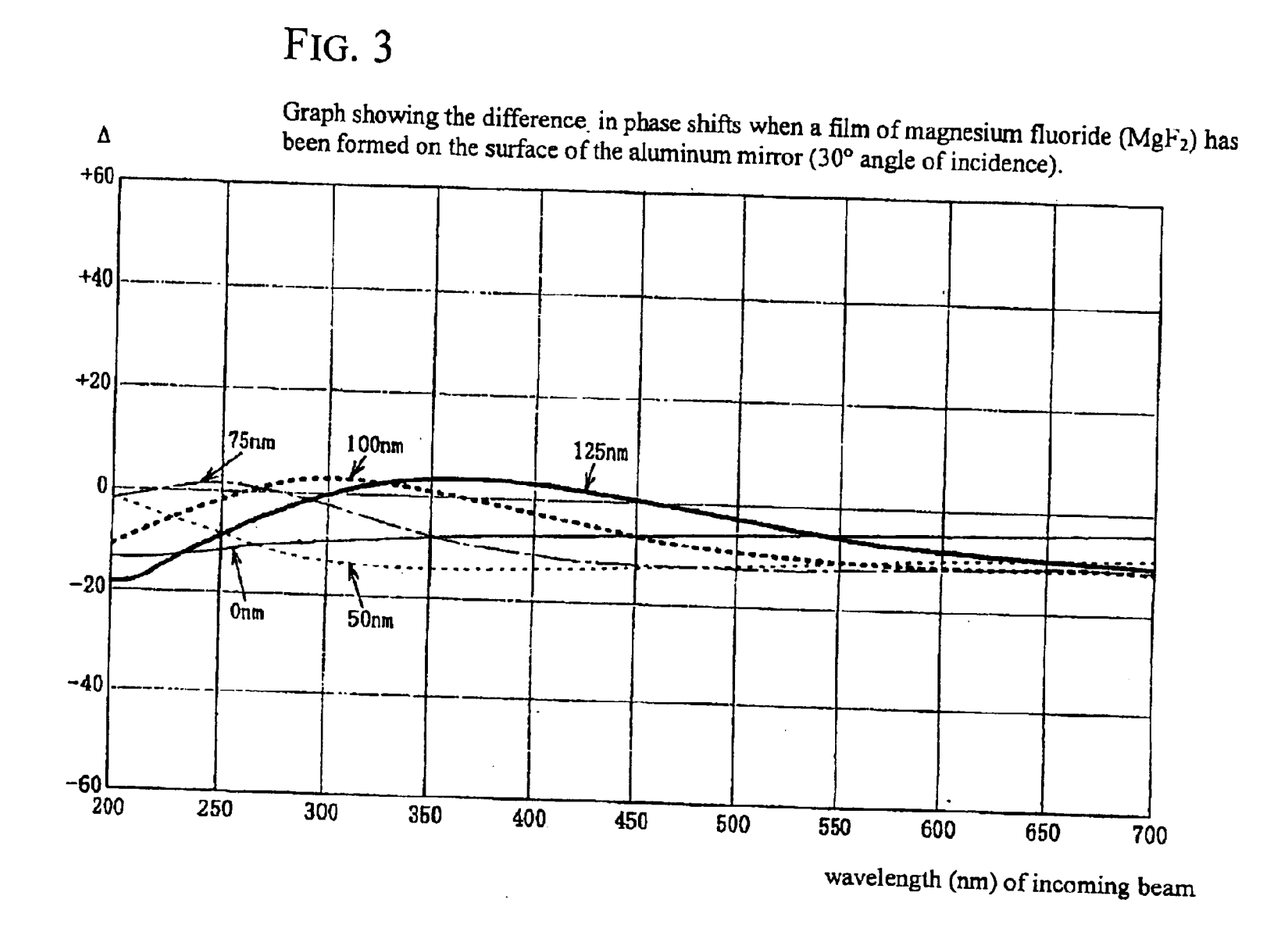
FIG. 3 is a graph showing the difference $\Delta$ in phase shifts when a layer of magnesium fluoride ($MgF_2$) has been formed on the surface of the aluminum mirror (30° angle of incidence).
Figure 4:
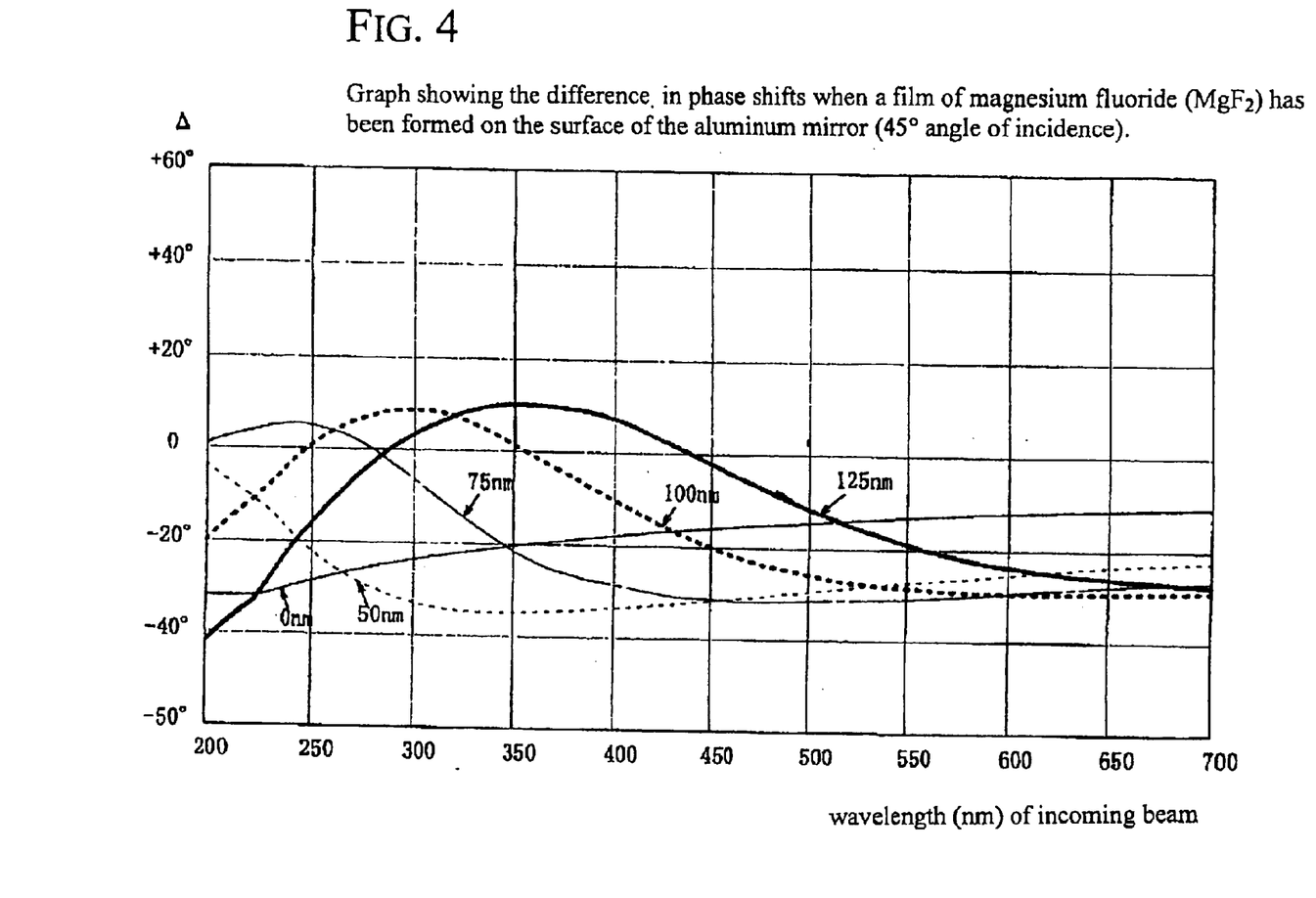
FIG. 4 is a graph showing the difference $\Delta$ in phase shifts when a layer of magnesium fluoride ($MgF_2$) has been formed on the surface of the aluminum mirror (45° angle of incidence).
Figure 5:
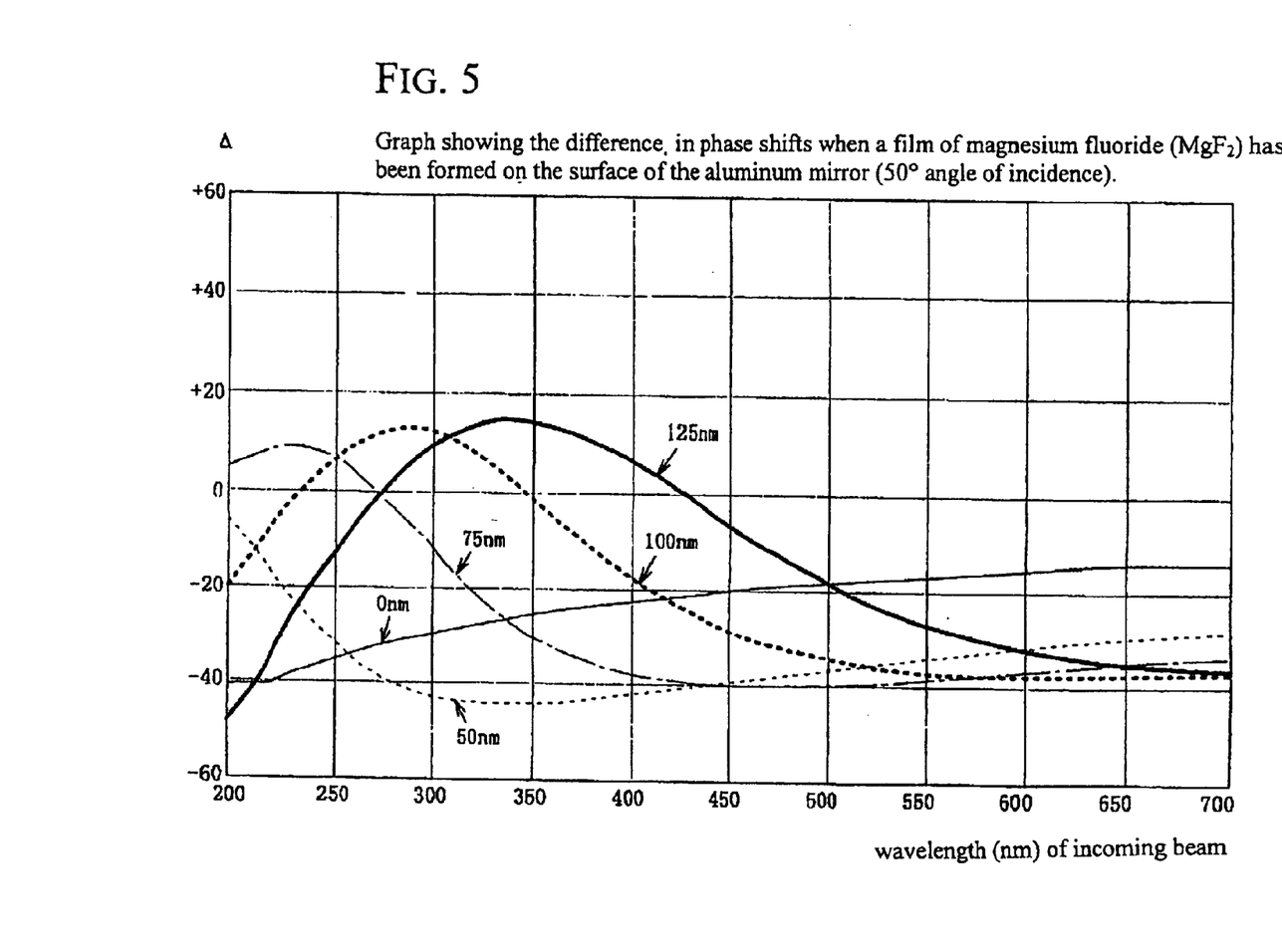
FIG. 5 is a graph showing the difference $\Delta$ in phase shifts when a layer of magnesium fluoride ($MgF_2$) has been formed on the surface of the aluminum mirror (50° angle of incidence).

FIGS. 3 to 5 show the difference Δ in phase shifts when a layer of magnesium fluoride (MgF$_2$) has been formed on the surface of the aluminum mirror of FIG. 2. The thickness of the layer of magnesium fluoride (MgF$_2$) is shown at 0 nm, 50 nm, 75 nm, 100 nm and 125 nm.

In FIGS. 3 to 5, the horizontal axis is the wavelength (run) of the incident polarized light, and the vertical axis is the difference Δ in degrees in the phase shifts of the polarization P component and the polarization S component. FIG. 3 shows the angle of incidence of the polarized light to the mirror as 30°; while in FIG. 4 the angle of incidence is 45°, and in FIG. 5 the angle of incidence is 50°.

As shown in FIG. 4, in the wavelength range from 250 nm to 350 nm, the difference Δ in the phase shifts of the polarization P component and the polarization S component is 20° or less for the layer thicknesses 100 nm and 125 nm. The difference Δ in the phase shifts of the polarization P component and the polarization S component is at least 20° when the layer thickness is 100 nm.

The angle of intersection of the plane A and plane B shown in FIG. 12 is 45°; when the angle of incidence to the reflecting mirror of polarized light with an extinction ratio of 15:1 is 45° and Δ≦±20° as described above, the extinction ratio of the reflected light will be 10:1. The polarized light extinction ratio of 15:1 used here is the extinction ratio for polarized lights that is generally obtained from polarization elements.

The 10:1 extinction ratio of the reflected light is, at present, the extinction ratio that is required to align the optical alignment layer; if the extinction ratio of the light reflected by the reflecting mirror is 10:1, there will be no problem.

Moreover, if Δ≦±15° and other conditions are the same, the extinction ratio of the reflected light will be at least 12:1. And if Δ≦±10°, the extinction ratio of the reflected light will be at least 13:6:1. That is, the smaller the difference Δ of the phase shifts, the better the extinction ratio of the reflected light will be.

Figure 6:
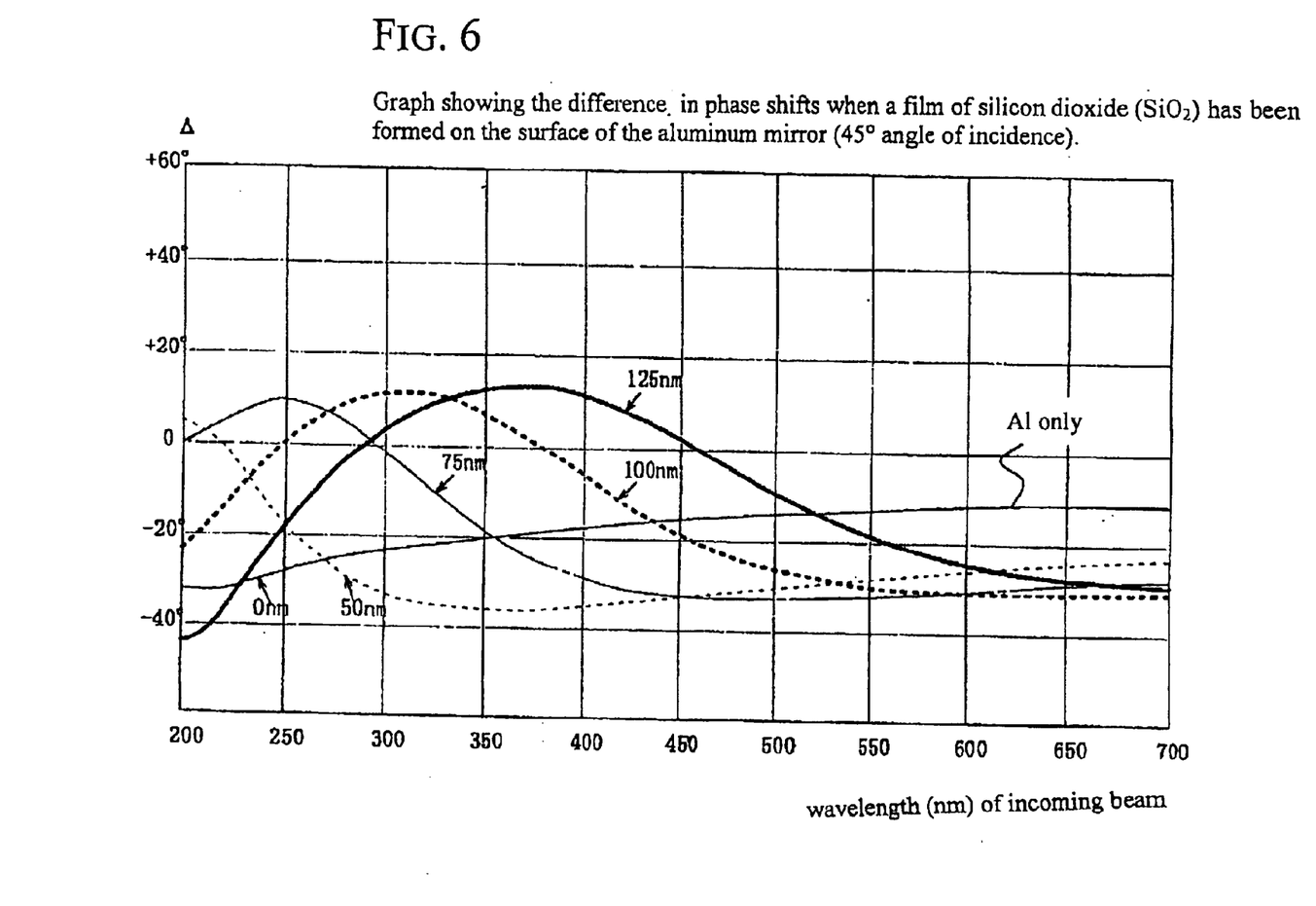
FIG. 6 is a graph showing the difference $\Delta$ in phase shifts when a layer of silicon dioxide ($SiO_2$) has been formed on the surface of the aluminum mirror (45° angle of incidence).

FIG. 6 shows the difference Δ in phase shifts when a layer of silicon dioxide (SiO$_2$) has been formed on the surface of the aluminum mirror. As above, the layer thicknesses of the silicon dioxide (SiO$_2$) shown are 0 nm, 50 nm, 75 nm, 100 nm and 125 nm. In the FIG. 6, the horizontal axis is the wavelength (nm) of the incident polarized light, and the vertical axis is the difference Δ in degrees in the phase shifts of the polarization P component and the polarization S component. The angle of incidence of the polarized light to the mirror is 45°. In FIG. 6, Δ is 20° or less for the layer thicknesses 75 nm, 100 nm and 125 nm within the wavelength range cited above, and Δ is the least when the layer thickness is 100 nm.

The thickness of the protection layer 11 to be formed on the reflective mirror here can be calculated as follows.

In the following calculation, the angle of incidence to the mirror of the polarized light is 45° (that is, the optical path is folded 90° by the reflecting mirror), and the plane A and plane B shown in FIG. 12 intersect at the angle of 45°.

Where the wavelength of the light incident on the protection layer 11 is λ, the index of refraction of the protection layer at that wavelength is $n_1$, the index of refraction in air is $n_0$ and the angle of incidence to the reflecting mirror is $\phi_0$, the layer thickness d, at which the difference Δ=0 in the phase shifts of the polarization P component and the polarization S component, can be found as follows (see, for example the "Handbook of Optical Engineering", Asakura Shoten, Jul. 25, 1981, pages 256–259).

The layer thickness d is expressed in the following equations (1) and (2). The A, B and C here are values determined by the $n_1$, d, $\phi_0$, λ, Δ cited above. Because the layer thickness d must be a real number, equation (3) must be realized.

Equations:

$$d=[(\lambda/4\pi)(n_1^2-n_0^2 \sin^2 \phi)^{1/2}]Re(i\ln\eta) \quad (1)$$

$$\eta=[-B\pm(B^2-4AC)^{1/2}]/2A \quad (2)$$

$$Im(i\ln\eta)=0, X=\ln\eta \quad (3)$$

Where X is a multi-valued function, and so there are multiple solutions for the equations above. If, of the values of d determined by the equations above, the smallest solution and the next smallest solution are taken as d1 and d2, respectively, then with the wavelength in the range from 250 nm to 350 nm, if 0.75×d1<d<1.25×d2 then the difference Δ between phase shifts of the polarization P component and the polarization S component (ΔP−ΔS) will be ≦±20°, and if 0.84×d1<d<1.18×d2 then Δ≦±15°, so that it will be possible to prevent reduction of the extinction ratio of the reflected light.

Based on the above, it is possible to select, as follows, the thickness of the layer to be formed on the second plane mirror 6 shown in FIG. 1, employing the following steps:

(1) Select the range of wavelengths of the polarized light and the material for the protection layer 11 in accordance with the optical alignment layer to be formed on the workpiece W. Further, determine the difference Δ between phase shifts of the polarization P component and the polarization S component on the basis of the desired extinction ratio.

(2) Carry out the optical design of the light irradiation apparatus and determine the angle of incidence of the polarized light to the second plane mirror 6.

(3) Select the layer thickness of the protection layer 11 using the graphs in FIGS. 3 to 6, based on the range of wavelengths of the polarized light, the material of the protection layer 11, the angle of incidence of the polarized light to the second plane mirror 6, and the difference Δ between phase shifts.

Figure 7:
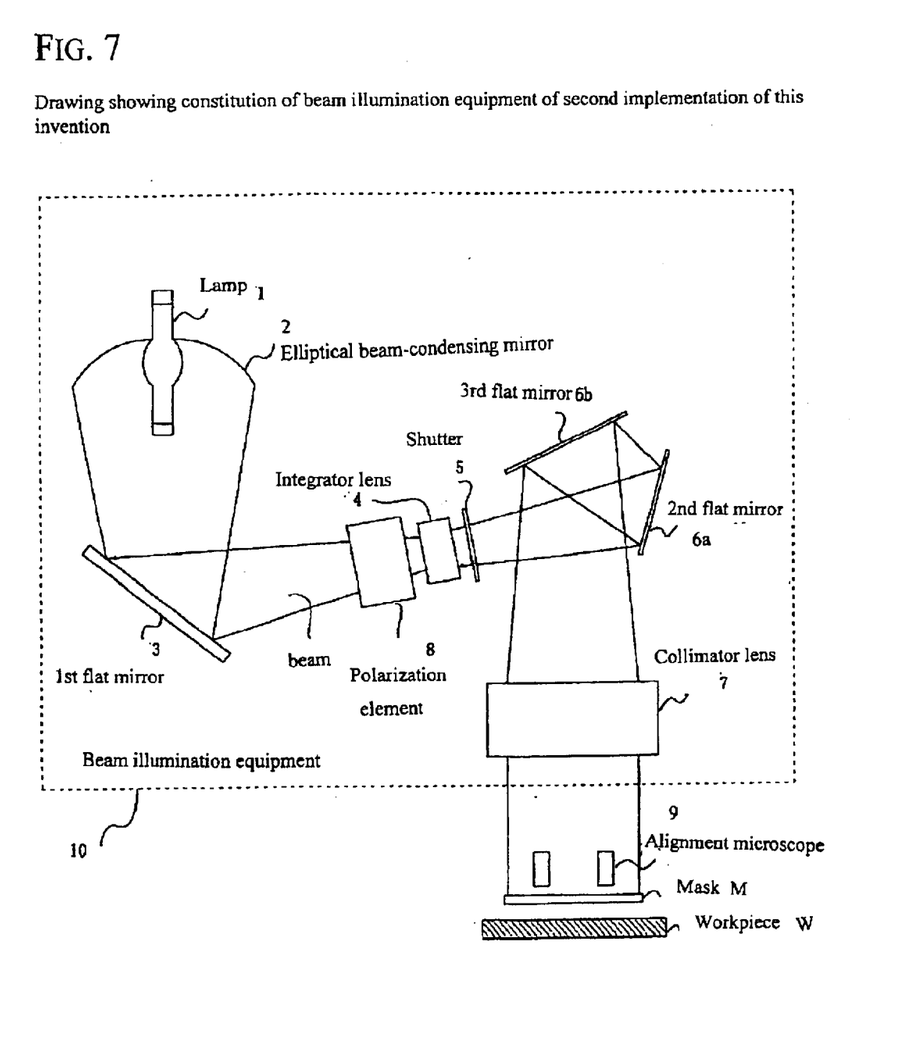
FIG. 7 is a polarized light irradiation apparatus of another embodiment of the invention.

FIG. 7 illustrates a polarized light irradiation apparatus of the second embodiment of this invention. Components in FIG. 7 are labeled with the same key as shown in FIG. 1. In this embodiment, the second plane mirror 6 is replaced with two plane mirrors 6a, 6b (called the second and third plane mirrors). The angles of incidence of the polarized light to the plane mirrors 6a, 6b are selected appropriately to minimize the difference Δ between phase shifts of the polarization P component and the polarization S component of the reflected light from the plane mirror 6b that irradiates the optical alignment layer.

In FIG. 7, as in FIG. 1, the light from the lamp 1 is condensed by an ellipsoidal condenser mirror 2; the optical path is folded by the first plane mirror 3 and is incident on the polarization element 8. The polarization element 8 is a device with multiple glass plates inclined at Brewster's angle with respect to the optical axis. The light of polarization P passes through but most light of polarization S is reflected. By this means it is possible to obtain polarized light with the desired extinction ratio.

The polarized light P that emerges from the polarization element 8 is incident on the integrator lens 4, then passes through the shutter 5 and is folded by the second plane mirror 6a and then by the third plane mirror 6b, into the collimator lens 7. The resulting parallel rays pass through the mask M and irradiate the alignment layer of the workpiece W.

Within the irradiation apparatus 10, the polarization element 8 can rotate around the optical axis of the light flux that is incident on the polarization element 8, and by rotating the polarization element 8, it is possible to change and set, as desired, the direction of the polarized light that irradiates the alignment layer.

Figure 8:
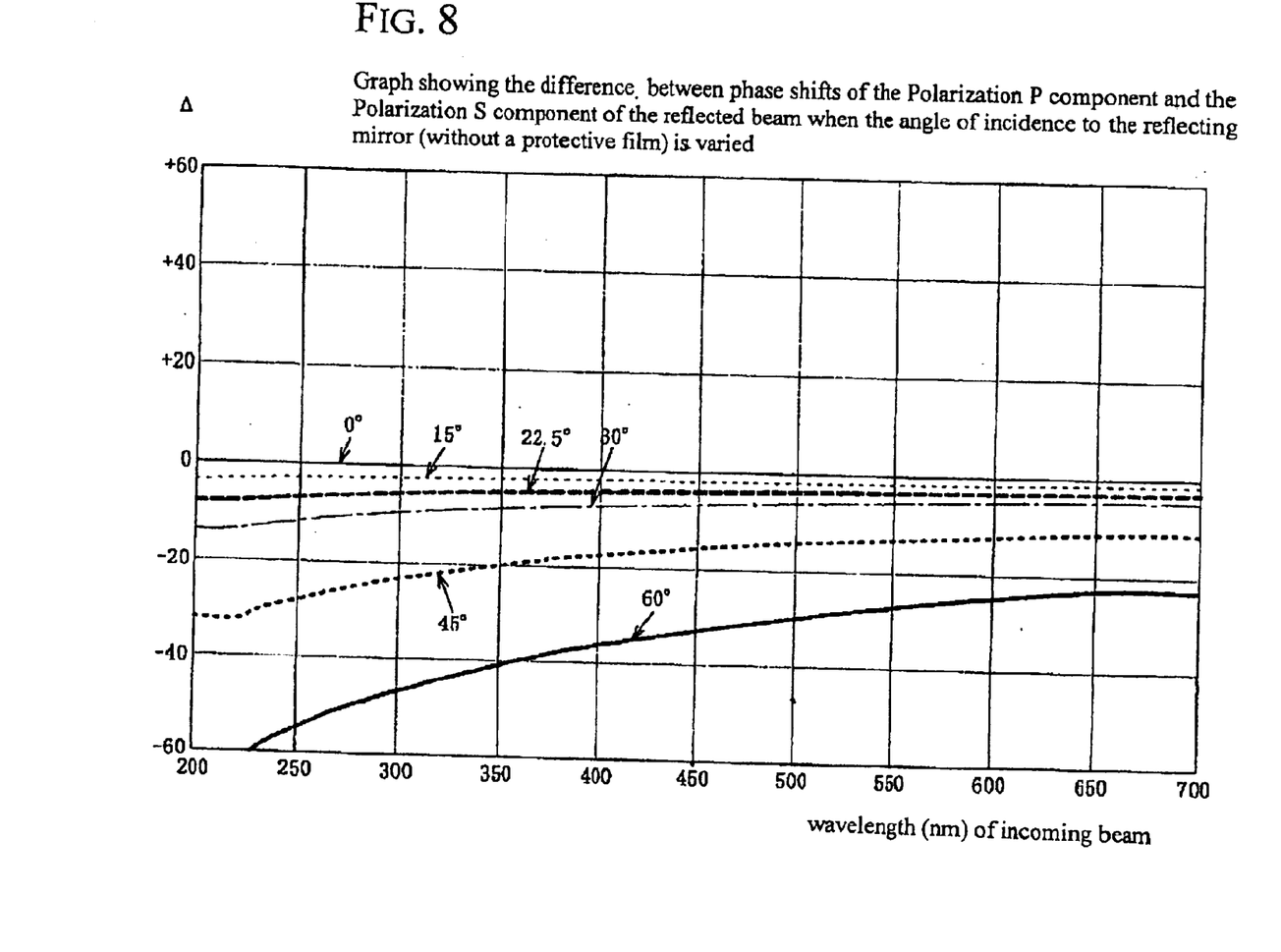
FIG. 8 is a graph showing the difference $\Delta$ between phase shifts of the polarization P component and the polarization S component of the reflected light when the angle of incidence to the reflecting mirror (without a protection layer) is varied.

FIG. 8 shows the difference Δ between phase shifts of the polarization P component and the polarization S component of the reflected light when the angle of incidence to the reflecting mirror (without a protection layer) is varied. The other conditions of the polarized light, such as the direction of polarization, are the same as described above. In FIG. 8, the horizontal axis is the wavelength (nm) of the incident polarized light, and the vertical axis is the difference Δ in degrees in the phase shifts of the polarization P component and the polarization S component. The angle of incidence is calculated at 0°, 15°, 22.5°, 30°, 45° and 60°.

As can be seen in FIG. 8, in the wavelength range from 250 nm to 350 nm, the smaller the angle of incidence to the reflecting mirror (without a protection layer), the smaller the difference Δ in the phase shifts of the reflected light. That is, in order to minimize the difference Δ in the phase shifts of the reflected light, the angle of incidence to the mirror (without a protection layer) should be as small as possible.

Figure 9:
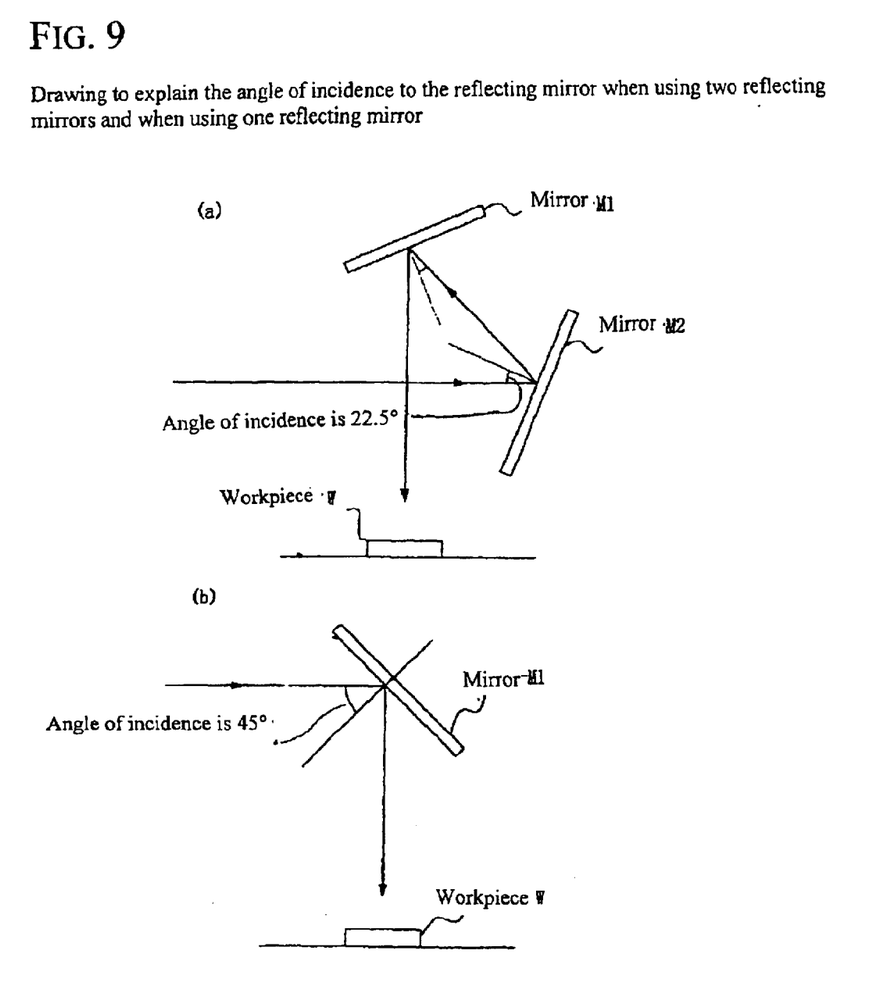
FIGS. 9a and 9b illustrate the effects on the angle of incidence to the reflecting mirror when using two reflecting mirrors and when using one reflecting mirror.

Accordingly, in the event that an alignment layer is irradiated with reflected polarized light that has been folded 90° using the reflecting mirrors (without a protection layer) described above, when the polarized light is folded 90° by reflecting with a single mirror and an angle of incidence of 45° as in FIG. 9(b), the difference Δ in the phase shifts of the reflected light that irradiates the alignment layer will be greater than 20°, but when it is folded 90° with two reflections at 22.5° using two mirrors (without a protection layer) as in FIG. 9(a), the difference Δ in the phase shifts of the reflected light that irradiates the alignment layer will be smaller than 20°, and the extinction ratio of the polarized light irradiating the workpiece W will be better.

However, the quantity of light diminishes as the number of mirror reflections increases, and the necessary quantity of light becomes unobtainable. Moreover, optical calculations including assurance of the area of irradiation become quite complex, and so it is necessary to carefully select the angle and number of reflections.

Further, the first embodiment and second embodiment described above may be combined in constructing the polarized light irradiation apparatus. For example, in the second embodiment, it is possible by selecting the layer type and optical thickness in accordance with the polarized light angles of incidence to the second 6a and third 6b plane mirrors and the wavelength required to align the optical alignment layer, then forming protection layers on the second 6a and third 6b plane mirrors, to put the difference Δ in the phase shifts of the polarization P component and polarization S component of the light reflected by the third plane mirror 6b below the desired angle, and thus keep the extinction ratio from dropping.

Figure 10:
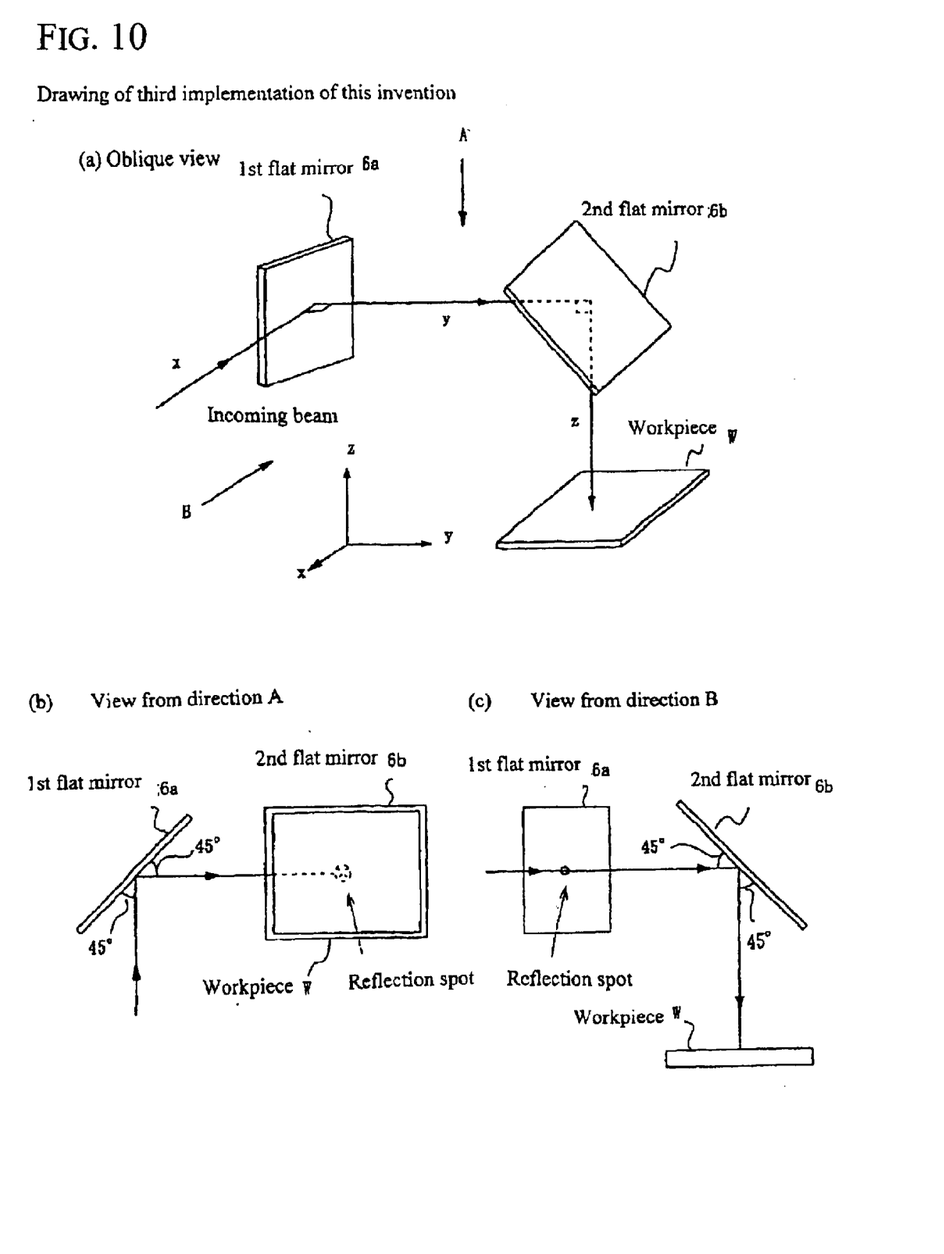
FIGS. 10a, 10b, and 10c illustrate a polarized light irradiation apparatus of a third embodiment of the invention.

FIGS. 10a, 10b, and 10c illustrate the third embodiment of the invention. These figures show only the second plane mirror of the polarized light irradiation apparatus shown in FIG. 1; the rest of elements are omitted. FIG. 10a is an oblique view, while FIG. 10b is a view from direction of arrow Δ of FIG. 10a, and FIG. 10c is a view from direction B of FIG. 10a.

In this embodiment, the second plane mirror 6 in FIG. 1 is replaced by two plane mirrors 6a, 6b (second plane mirror 6a and third plane mirror 6b), with the polarized light reflected such that the phase shift is canceled out by the two plane mirrors 6a, 6b. In FIG. 10a, the second plane mirror 6a and the third plane mirror 6b are mirrors made of the same material. They are positioned so that the plane determined by the axis of the incoming polarized light and the axis of the reflected light of the third plane mirror 6b is perpendicular to the plane determined by the axis of the incoming light and the axis of the reflected light of the second plane mirror 6a, with the angle of incidence of the polarized light to the second plane mirror 6a equaling its angle of incidence to the third plane mirror 6b. If the second plane mirror 6a and the third plane mirror 6b are made of the same material, it is usually best, if there are to be protection layers on the plane mirrors 6a, 6b, that the protection layers be of the same type and thickness.

In FIG. 10a, using three perpendicular axes XYZ to provide reference planes, the incident light parallel to the X axis is incident on the second plane mirror 6a with an angle of incidence of 45°, and is reflected in light parallel to the Y axis. This light parallel to the Y axis is incident on the third plane mirror 6b with an angle of incidence of 45°, and is reflected in light parallel to the Z axis.

When the plane mirrors are positioned as shown in FIG. 10a, the polarization P component and the polarization S component of the light that is incident on the second plane mirror 6a are rotated 90° and incident on the third plane mirror 6b. In other words, the polarization P component and the polarization S component of the light that is incident on the third plane mirror 6b are reversed from the polarization P component and the polarization S component of the light that is incident on the second plane mirror 6a.

For that reason, the component that was delayed when reflected from the second plane mirror 6a is advanced by the same amount when reflected from the third plane mirror 6b. That is, the phase shift that occurs at the second plane mirror 6a is canceled out when reflected from the third plane mirror 6b.

Consequently, the reflected light from the third plane mirror 6b is a linearly polarized light equivalent to the polarized light that was incident on the second plane mirror 6a. It is therefore possible by method to prevent a drop in the extinction ratio of the reflected light.

FIG. 10a depicts an easily illustrated example, but it is not necessary that the angles of incidence to the second and third plane mirror 6a, 6b be 45° as shown in FIG. 10a. As long as the second and third plane mirrors are positioned so that the plane determined by the optical axis of the incident light and the optical axis of the reflected light of the third plane mirror 6b is perpendicular to the plane determined by the optical axis of the incident light and the optical axis of the reflected light of the second plane mirror 6a, with the angle of incidence of the polarized light to the second plane mirror 6a equaling its angle of incidence to the third plane mirror 6b, the phase shift that occurs at the second plane mirror 6a will be canceled by the third plane mirror 6b.

In the embodiments described above, the light from the lamp had been changed by the polarization element to a linearly polarized light, but source of the polarized light for this invention is not so limited and polarized light can be obtained by use of a laser device as well.

As can be seen from the explanation above, the following results can be obtained by this invention:

(1) the polarized light irradiation apparatus is constituted such that the difference of phase shift of the polarization p component and the polarization s component of the reflected light at the mirror that reflects the polarized light is less than 20° without regard to the direction of the electrical field of the polarized light incident on the reflecting mirror with the result that even if the direction of polarization of the linearly polarized light leaving the polarization element changes, the light reflected from the reflecting mirror can minimize the angle of ellipticity at the desired wavelength, and a reduction in the extinction ratio of the reflected light can be prevented.

(2) it is possible to construct a polarized light irradiation apparatus that can, without rotating the substrate, irradiate in the desired direction of polarization polarized light of a desired wavelength and extinction ratio onto a substrate on which an alignment layer is formed.

What is claimed is:

1. Polarized light irradiation apparatus for irradiating a photo alignment layer with a polarized light reflected from a reflecting mirror, comprising:

polarizing element, for polarizing light, wherein the polarizing element is rotatable around an optical axis of a center of a light beam incident on the polarizing element so as to effect changes in direction of polarization of the light incident on the polarizing element;

a reflecting mirror, for reflecting a polarized light, positioned so that a first plane of the polarized light as determined by the optical axis of incident polarized light and the direction of the electrical field of the polarized right and a second plane as determined by the optical axis of the incident polarized light and the optical axis of the light reflected by the reflecting mirror are neither parallel nor perpendicular, and means for providing a difference in the phase shift of a polarization P component and a polarization S component of the polarized light reflected from the reflecting mirror of less than or equal to ±20°, wherein, the polarized light incident on the reflecting mirror includes both P component and S component, wherein the means for providing a difference in the phase shift of the polarization P component and the polarization S component of the polarized light reflected from the reflecting mirror is provided by a dielectric layer on the surface of the reflecting mirror, and wherein the material and thickness of a dielectric layer is selected in accordance with the angle of incidence of the polarized light to the reflecting mirror to achieve a difference in the phase shift of less than or equal to ±20°.

* * * * *